(12) United States Patent  (10) Patent No.: US 7,344,007 B2
Severinsson  (45) Date of Patent: Mar. 18, 2008

(54) DISK BRAKE

(75) Inventor: Lars Severinsson, Hishult (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 11/077,650

(22) Filed: Mar. 11, 2005

(65) Prior Publication Data

US 2005/0211509 A1    Sep. 29, 2005

Related U.S. Application Data

(63) Continuation of application No. PCT/EP2003/009820, filed on Sep. 4, 2003.

(30) Foreign Application Priority Data

Sep. 12, 2002  (DE) ............................... 102 42 397

(51) Int. Cl.
*F16D 55/08*  (2006.01)
(52) U.S. Cl. .................... 188/72.9; 188/72.7; 188/73.1
(58) Field of Classification Search ............... 188/72.9, 188/72.7, 73.1, 72.1, 73.41, 18 A
See application file for complete search history.

(56) References Cited

U.S. PATENT DOCUMENTS 5,433,298 A * 7/1995 Antony et al. ............. 188/72.7
5,547,048 A   8/1996 Anthony .................... 188/72.9
5,697,474 A * 12/1997 Antony et al. ............. 188/72.6
5,927,445 A * 7/1999 Bieker et al. ............... 188/72.9
6,311,809 B1 * 11/2001 Thomas et al. ............ 188/72.9

FOREIGN PATENT DOCUMENTS

| DE | 20 57 322   | 5/1972  |
|----|-------------|---------|
| DE | 26 14 321   | 10/1976 |
| DE | 37 16 202   | 11/1988 |
| DE | 40 32 885   | 4/1992  |
| EP | 0 553 105   | 8/1993  |
| EP | 0 942 191   | 9/1999  |
| WO | 92/07224    | 4/1992  |
| WO | 2004/027281 | 4/2004  |

* cited by examiner

*Primary Examiner*—Melody M. Burch
(74) *Attorney, Agent, or Firm*—St. Onge Steward Johnston & Reens LLC

(57) ABSTRACT

The invention relates to a disk brake provided with a brake caliper comprising a brake disk, a sliding member which can be displaced in a vertical manner in relation to the surface of the brake disk in the brake caliper and can be engaged against the brake disk, and a clamping device comprising a rotary lever and a rotational body. In one embodiment of the invention, the rotary lever comprises a domed-shaped control surface whereon the rotational body is arranged in a rotational contact position. By pivoting said rotary lever in a radial segment bearing, the rotational body and the rotary lever modify their position, in relation to each other, such that the sliding member is displaced in order to apply braking force. The rotational body then carries out a full rotational movement on the control surface.

9 Claims, 6 Drawing Sheets

DISK BRAKE

This application is a continuation of pending International Patent Application No. PCT/EP2003/009820 filed Sep. 4, 2003, which designates the United States and claims priority of pending German Application No. 102 42 397.0 filed Sep. 12, 2002.

FIELD OF THE INVENTION

The present invention relates to a disk brake for motor vehicles, especially for heavy trucks, with a sliding member which can be displaced in a vertical manner in relation to the surface of the brake disk in the brake caliper and can be engaged against the brake disk. The sliding member is moved against the brake disk by means of a power transmission device that includes a rotary lever.

The state of the art includes many familiar concepts for transmitting power to a sliding member or a crossbar from a rotary lever which is activated hydraulically or pneumatically.

Thus, for instance, DE 20 57 322 C3 reports an activation device for a partial-padded disk brake. A mechanically activated brake lever is mounted so that it can rotate by means of a shaft lying vertical to and displaced from the axis of the brake piston moving in the brake caliper housing. To transmit pressure of the mechanical activating force from the brake lever to the sliding member or the brake piston, a roller bearing is provided in the form of a cylindrical roller, which is held in place in channels opposite to one another in the front side of the sliding member on the one hand and in the brake lever on the other hand. The brake lever itself is mounted in a half-cylindrical steering track in a cap of the brake caliper, and a cylindrical trough is situated radially and eccentrically displaced opposite this steering track in which the cylindrical roller is inserted. On the opposite side the cylindrical roller extends into a groove with a flat surface running parallel to the surface of the brake disk and supports itself against this brake disk. During activation the roller, which is situated so that it slides eccentrically to the guide track in the trough of the brake lever, is displaced in the direction toward the gliding member, so that this member is then moved in the direction toward the brake disk. As a result the roller shifts in the level groove of the sliding member, so that the width of this groove is measured in such a way that lateral forces are prevented as much as possible.

In addition, DE 26 14 321 C3 reports that the rotary lever is provided on the one hand, on the side turned away from the brake disk, with a rolling surface, with which this disk supports itself on a level abutment surface and, on the other hand, on the side turned toward the brake disk, with a guide track for a roller, which in turn is positioned in rotational manner on a front-side, flat surface of the sliding member or of a pressure rod. With such an arrangement it should be possible to obtain a strong transmission ratio between the rotary lever and the sliding member. The rotary lever is positioned on the brake caliper by means of a peg bearing, and the control track on the brake disk side has a contour of a type that causes an increased power transmission to the roller and thus to the sliding member by means of a cam-like elevation in the course of the control track.

Patent DE 37 16 202 A1 teaches how to provide, between an eccentric section of the rotary lever and a sliding member, running parallel to the radial surface of the brake disk, a pressure plate which is supported by a level roller bearing on the sliding member so that the sliding path of the pressure plate is restricted. The eccentric section of the rotary leer is rotationally positioned on the side opposite the pressure plate in the brake caliper by means of a semicircular roller bearing. A cam, which forms the eccentric section of the rotary lever and is turned toward the brake disk, shifts onto the pressure plate during the brake activation.

In an additional disk brake clamping device reported in the art, in EP 0 553 105 B1, a mounting device in the form of a roller bearing is provided between an eccentric section of the rotary lever and the sliding member and couples the rotary lever with the sliding member eccentrically to the rotational axis of the rotary lever. A bolt is received in semicylindrical recesses, which are opposite one another, of the rotary lever on the one hand and of the sliding member on the other hand, and the rotary lever is supported against the brake caliper on the side turned away from the bolt by means of a semicircular rotary lever. In this clamping device, the power transmission occurs in such a way that the bolt, eccentric section of the rotary lever, and sliding member turn with respect to one another. The bolt is positioned so that it rotates exclusively between the two components, rotary lever and sliding member, which requires that the sliding members is positioned in the brake caliper so that it can rotate or tip. The disadvantage, however, is that when the brake is activated, the brake pad cannot be aligned exactly parallel to the brake disk, and this results in uneven operation.

It is also been shown, in EP 0 942 191 B1, how to couple the eccentric section of the brake lever, in the direction toward the brake disk, by means of a first radial segment bearing, with the sliding member and, in the direction away from the brake disk, be means of a second radial segment bearing, with an abutment that is firmly connected with the brake caliper and is rotational in shape.

The aforementioned configurations and mechanisms known in the state of the art for power transmission in a clamping device for disk brakes have several different disadvantages.

For instance, the slide mounting, as reported in DE 20 577 322 C3, by means of a bolt with an increased friction which, especially with the extreme power pressure in disk brakes, shows strongly negative effects in terms of wear and efficiency.

To avoid such friction and wearing effects, the state of the art foresees, as for instance in EP 0 553 305 B1 or EP 0 942 191 B1, the use of conventional roller bearings. The embodiments reported in the state of the art show an additional disadvantage, however, indicating that for trouble-free power transmission the sliding member or cross beam must tip, which, as already pointed out, causes irregular application of the brake pad on the brake disk and, associated with this, irregular wearing.

In principle, however, such tipping is not desirable with respect to the power transmission and is merely accepted as a consequence. To avoid this while also preventing lateral sliding of the power transmission member onto the sliding member or the cross beam, caused by friction, wear, and hysteressis, DE 3 716 202 A1 proposes the pressure plate. The structure indicated in that patent, however, is extremely complicated and is distinguished by increased costs as a result of the additional components that must be designed and produced.

In addition, a trait common to all embodiments of a power transmission in a clamping unit for disk brakes according to the state of the art is that the power transmission, owing to the particular mechanism in application, and in particular its sequence during the braking or brake-releasing stage, cannot be controlled in a definite manner.

On the basis of the aforementioned disadvantages presented in relation to the state of the art, the object of the present invention is to perfect a disk brake of the generic type in such a way that a power transmission mechanism in the clamping unit employed in this process is provided which avoids the negative effects of friction and wear, offers greater effectiveness and a better power transmission ratio, and includes components that are simple and cost-effective to produce.

In addition, it is a further object of the present invention to establish firm definitions of the power transmission depending on the requirements to be observed as well as the construction parameters. In particular, the goal is to achieve progressivity in the power transmission, that is, with a braking power at the end of the braking process that is increasing and greater in comparison with the beginning of the braking process.

In a first embodiment according to the invention, the rotary lever, on its end facing away from the activation end, on which the bolt of a pneumatic or hydraulic cylinder engages, has a mounting surface that is domed cylindrically toward the outside, around the rotational axis of its momentary position. Radially opposite this cylindrical bearing surface is a control surface, in such a way that the control surface is eccentrically arranged with respect to the bearing surface. The control surface has a shape that is domed inward in concave fashion.

On the control surface there lies a rotational body, for example a roller rotationally connected. In other words, the rotational body, in the relative motions that occur as a consequence of the power transmission, completes a pure rolling motion on this control surface; that is, no sliding or pitching occurs.

The rotary lever is positioned to rotate in at least one radial segment bearing. The power transmission to a sliding member or a cross bar occurs, according to the invention, through the special positioning of the construction unit consisting of the rotary lever and the rotational body. This construction unit, on one side, lies on the sliding member and, on the other side, on a supporting surface of the brake caliper, so that when the rotary lever pivots in the radial segment bearing and through mutual displacement of rotational bodies and rotary lever, the sliding member is displaced in the direction of the brake disk.

As a result, the momentary positioning point of the rotational axis of the rotary lever migrates continually on its rotational surface during the pivotal motion, that is, the direction toward the brake disk. The momentary position of the imaginary rotational axis of the control surface likewise changes as a result during the pivotal motion, following an approaching circular course. In the present embodiment, the rotary lever is positioned as if "floating" between the rotational body and the sliding member, because the lever has no stable rotational axis.

According to the invention it is thus essential that every single element of the control surface of the rotary lever has a curvature radius that is greater than the radius of the rotational body. This configuration of the control surface ensures that the rotational body executes a pure rolling motion on the control surface during the brake activation. Because, thanks to this pure rolling motion, no gliding or rolling of movable components occurs in the clamping device, the friction factor and the related wear in the disk brake according to the invention are negligible. For this reason the power transmission from the rotary lever to the sliding members in a configuration of this kind is distinguished by heightened efficiency and improved effectiveness.

Because the rotational body is enabled to roll downward on a control surface when the brake is activated, the necessary degree of freedom is granted that avoids an unnecessary tipping of the sliding member, so that this member an be moved in a strictly axial manner. An associated advantage is that, thanks to the level, parallel engagement of the brake pad on the brake disk, no irregular friction appears, and thus wear can be kept low.

In an additional configuration of this embodiment according to the invention, the control surface is configured in such a way that the curvature radius is distinguished in every element of this control surface from every other element; that is, that no element exists having the same curvature radius as another element of this control surface. The individual curvature radii are thus selected so that the control surface widens in concave manner on both its end sides. The extent of the widening, determined by the selection of the individual curvature radii, is chosen according to the invention in such a way that a defined power transmission can be achieved if the rotational body rolls downward on this control surface.

To achieve progressive power transmission whereby the braking force acting on the brake disk is greater at the end of the braking process, that is, still with a only minor stroke of the sliding member, than at the beginning of the braking process, that is, with a longer stroke of the sliding member in the direction of the brake disk, the invention provides that the control surface in its lower section, viewed from the activation end of the rotary lever, has a greater widening than its upper section. During the pivoting motion of the rotary lever in the control surface, the rotational body rolls downward in the direction toward the activation end or in the direction toward the upper section of this control surface. Therefore, with the continuing pivoting motion of the rotary lever in the upper section of the control surface, it requires a greater curving inclination than in the lower section, which corresponds to the beginning of the brake activation, in order to reach the desired progressive action.

In another advantageous configuration of this embodiment of the disk brake according to the present invention, the rotational body, on its side lying opposite the control surface of the rotary lever, is mounted so that it can rotate by means of a second radial segment bearing.

It is clear that in this configuration, both activation directions can be considered, in principle. Thus it is possible, first, that the bearing surface of the rotary lever is coupled with the sliding member by means of the first radial segment bearing, and consequently the rotational body is coupled with the brake caliper by means of the second radial segment bearing. Second, however, it is also possible that the bearing surface of the rotary lever is coupled by means of the first radial segment bearing with the brake caliper and then the rotational body by means of the second radial segment bearing is coupled with the sliding member. In other words, the sequence of the individual components of the construction unit consisting of the first radial segment bearing, rotary lever, rotational body, and second radial segment bearing is reversed with respect to the activation direction between the sliding member and the brake caliper.

In another configuration of the disk brake according to the invention, at least one brace is provided, whose end turned away from the brake disk forms a bearing shell for one of these radial segment bearings. The brace is engaged with a cap that serves to close an opening in the brake caliper which is included in this brake calipers on its side turned toward the brake disk and through which it is possible to insert components of the clamping unit during installation. Because the sliding member is additionally supported on this cap by means of a spring, the entire clamping unit can be held together by the configuration with at least one brace.

In another advantageous configuration, the clamping unit has two braces, between which the rotary lever is positioned so that it is freely mobile, and which completely surround the sliding member on its upper side and lower side as well as its rear portion.

The sliding member can be a single pressure rod. However, this invention also calls for a cross bar as sliding member, in which two parallel adjustment spindles are positioned. Between the cross bar and the cap a gear wheel mechanism is situated, which can be of any desired configuration and which serves to synchronize the adjustment spindles with one another.

In a second embodiment of the disk brake or clamping unit according to the invention, the rotary lever has a first bearing surface which is domed outward cylindrically around its rotational axis. Radially opposite to this first bearing surface is a second bearing surface, likewise cylindrical in shape, which is domed inward and is eccentrically displaced with respect to the first bearing surface.

A rotational body is positioned so that it can rotate with the second bearing surface in this configuration and, on its side opposite this second bearing surface, is in rotary contact with a level control surface. Here too, during the power transmission upon breaking there is no slipping or turning of the rotational body on the control surface.

On the first cylindrical bearing surface there is, on the outside, a first radial segment bearing and on the second cylindrical bearing surface, on the inside, a second radial segment bearing.

The power transmission proceeds in such a way that the construction unit consisting of the rotary lever and rotational body, in contact with the brake caliper, is positioned between the sliding member and the brake caliper so that the sliding member is displaced, on pivoting the rotary lever between the first radial segment bearing and the second radial segment bearing on the one hand, and by resulting rolling downward of the rotational body on the control surface, on the other hand.

In this configuration as well, two different variants are possible in principle.

Thus, on the one hand, the brake caliper can have the level control surface, which thus requires that the first bearing surface is coupled by means of the first radial segment bearing with the sliding member and the rotational body is coupled by means of the second radial segment bearing with the rotary lever.

It is also possible, however, that, in turn, the sequence of the individual components of the construction unit consisting of the first radial segment bearing, second radial segment bearing, rotary lever, and rotational body is reversed in the activation direction, so that the sliding member correspondingly contains the control surface and then the first bearing surface is coupled by means of the first radial segment bearing with the brake caliper and the rotational body by means of the second radial segment bearing is coupled with the rotary lever.

Both configurations of the disk brake according to the invention are distinguished in that they have a simple way of functioning, which in addition can be produced with simple, commercially available components.

Additional advantageous configurations and characteristics of the inventive disk brake can be seen from the embodiment presented in connection with the enclosed illustrations.

BRIEF DESCRIPTION OF THE ILLUSTRATIONS

DETAILED DESCRIPTION OF THE DRAWINGS

Figure 1:
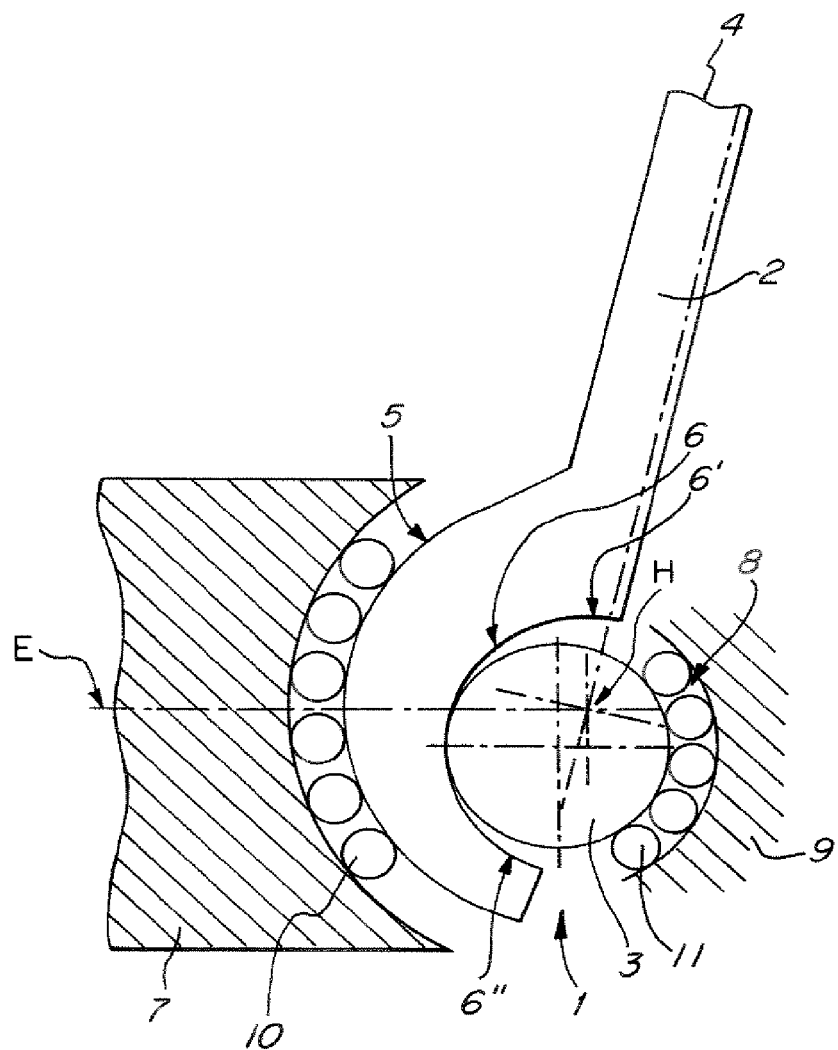
FIG. 1 shows a schematic depiction of a first embodiment of the power transmission unit according to the invention in one activation direction.

FIG. 1 reflects a schematic view of the construction unit 1 for power transmission between a brake power production member, as for instance a hydraulic cylinder (not shown here), and the member for transmitting the braking force to the brake disk.

Construction unit 1 consists essentially of a rotary lever 2 and a rotational body 3.

The rotary lever 2 has at that end which is turned away from its activation end 4 and on which, for instance, the piston rod of the hydraulic cylinder acts, a first bearing surface 5. This bearing surface 5 is cylindrically domed outward.

Radially opposite to this first bearing surface 5 is a control surface 6. The control surface 6, on the one hand, is positioned eccentrically to the first bearing surface 5 and, on the other hand, has a concave shape that is domed inward.

The rotational body is in contact with the control surface 6; that is, during the brake activation and the pivoting of the rotary lever 2, the rotational body 3 completes a pure rolling motion on this control surface 6 without slipping or shifting in the process.

In other words, the control surface 6 is configured so that between a cylindrical surface of the rotational body 3 and this control surface 6 there is always contact in only one point (element), or in one line. For this purpose, according to the invention, the radius of the rotational body 3 is always smaller than any curvature radius of the control surface 6 in every single element.

The construction unit 1 consisting of rotary lever 2 and rotational body 3 is positioned between a sliding member 7, which serves to transmit the braking force onto the brake disk, and a supporting surface 8, lying opposite this sliding member 7, of a brake caliper 9.

Thus the rotary lever 2 is positioned as "floating" in such a way that the momentary position of its rotational axis H continually changes during its pivoting and thus during the displacement of the sliding member 7 on a rotational surface E, which runs vertical to the surface of the brake disk. The rotational axis H completes a motion onto the rotational axis E together with the sliding member 7 in the direction toward the brake disk.

In the embodiment shown in FIG. 1, the sliding member 7 is in the left side; that is, the activation direction in pivoting the rotary lever 2 to the left is likewise pointed to the left in this FIG. 1.

The bearing surface 5 of the rotary lever 2 is coupled by means of a radial segment bearing 10 with the sliding member 7. Situated opposite to it, the rotational body 3 by means of a second radial segment bearing 11 is mounted on the support surface of the brake caliper 9 so that it can rotate.

As can be seen in FIG. 1, the control surface 6 widens in concave manner, with respect to the cylindrical surface of the rotational body 3, on both sides of the point of contact between the control surface 6 and the cylindrical surface of the rotational body 3 in a resting point of the rotary lever 2. Thus, according to the invention, the particular curvature radius is selected in such a way—depending on the desired power course of the braking force during the braking or release process—that it is different in every element of the control surface 6.

To reach, for instance, a progressive braking force during braking, that is, so that the braking force at the end of the braking process is greater than at the beginning of the braking process, the control surface 6 is shaped in such a way that it has a greater widening in its lower section 6' than in its upper section 6". Consequently, at the end of the braking process, the sliding member 7 can exert a greater pressure in pivoting the rotary lever 2 in the radial segment bearing 10 and during the eccentric reciprocal displacement of the rotary lever 2 and rotational body 3, which rolls downward onto this section 6' of the control surface 6.

Figure 2:
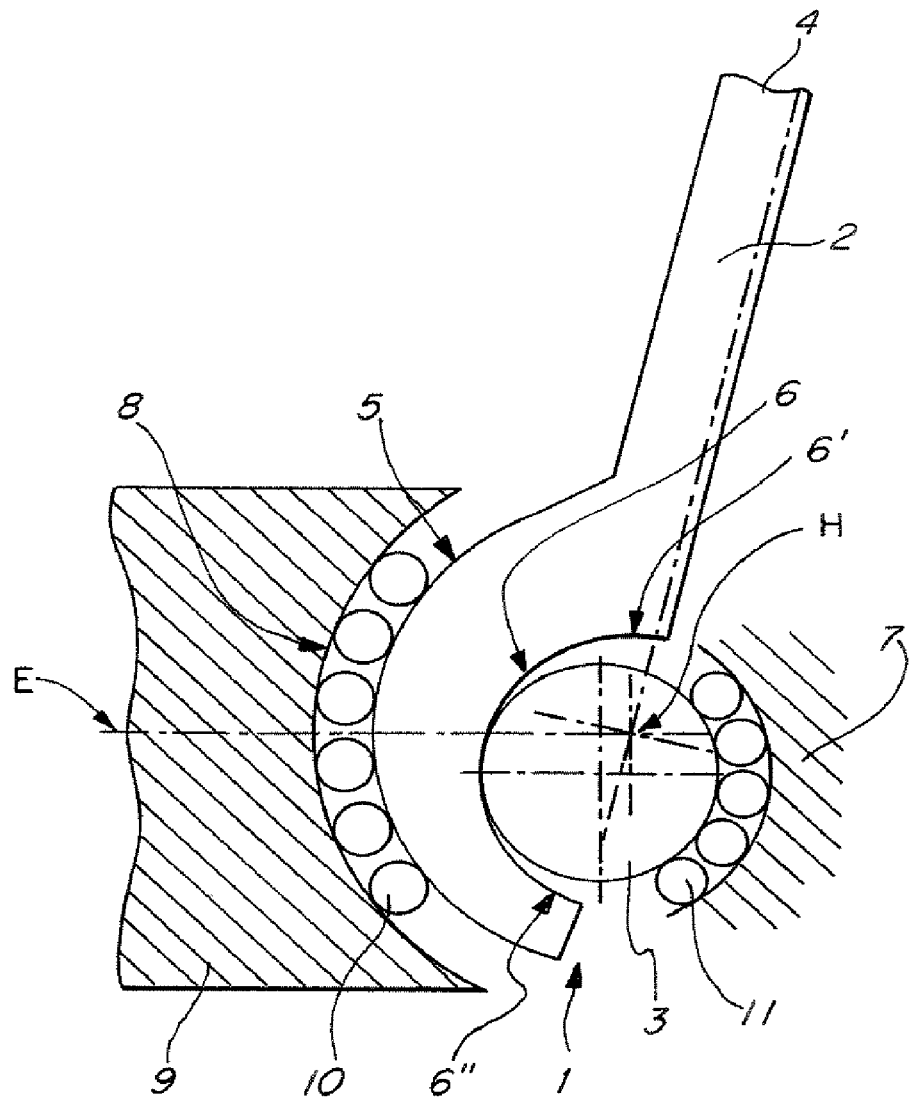
FIG. 2 shows a schematic depiction of this power transmission unit in a reverse activation direction.

The construction unit 1 consisting of rotary lever 2 and rotational body 3, however, can also be positioned, with its components in reversed direction, between the sliding member 7 and the brake caliper 9. Such a variant of this configuration is seen schematically in FIG. 2. In this figure the sliding member 7, situated in the right-hand side of FIG. 2, moves in the opposite direction toward the right upon pivoting of the rotary lever 2 toward the left. For this purpose the rotary lever 2 stands in connection with the brake caliper 9 and the rotational body 3 by means of the first radial segment bearing 10 and the rotational body 3 on its side lying opposite the control surface 6 is connected with the sliding member 7 by means of the second radial segment bearing 11.

Figure 3:
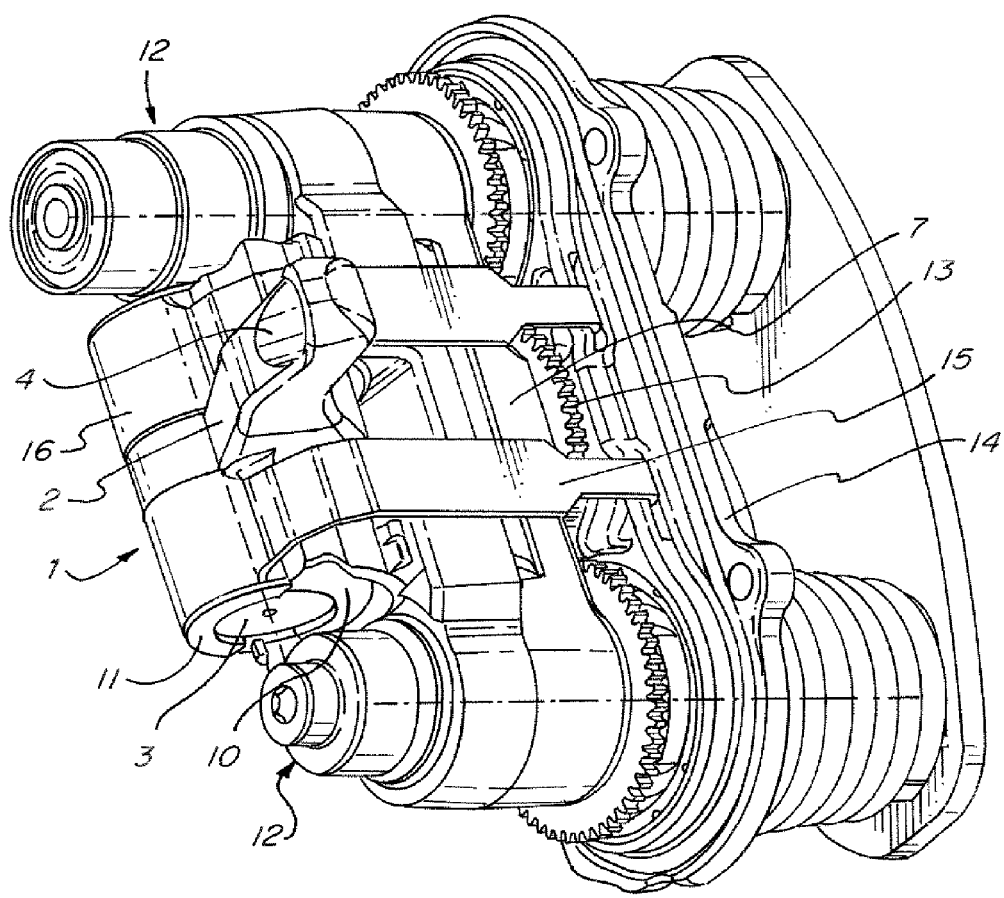
FIG. 3 shows a perspective drawing of the assembled clamping unit in the invention's first embodiment.

In FIG. 3 the clamping unit, which contains the configuration according to FIG. 1, is shown in perspective view. The sliding member 7 is configured with the shape of a cross beam, which includes two adjustment spindles 12. The adjustment spindles 12 are synchronized with one another by means of a gear wheel mechanism 13.

The gear wheel mechanism 12 is positioned between the slide member 7 and a cap 14 that serves to close an opening in a section of the brake caliper 9 on the brake disk side.

Figure 4:
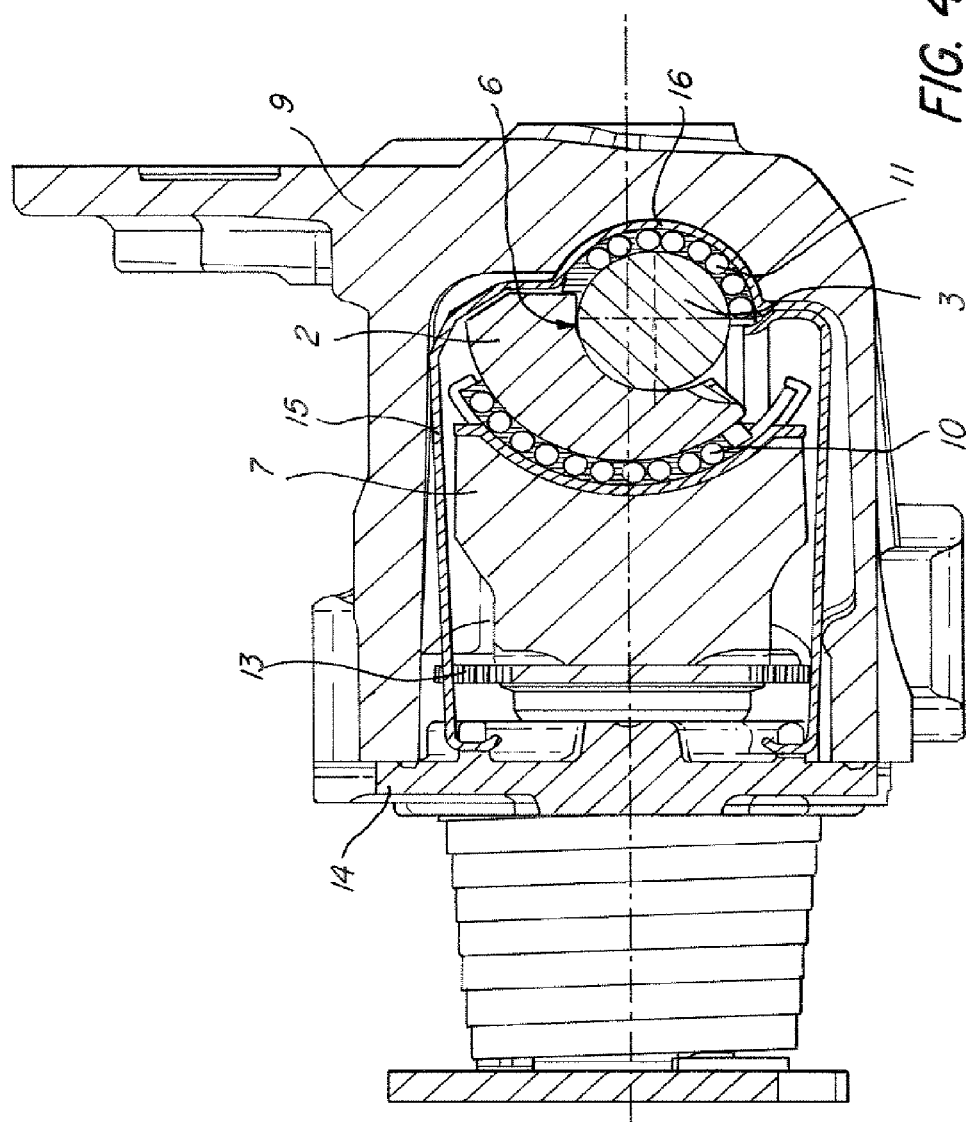
FIG. 4 shows a sectional view along line A-A from FIG. 3.

FIG. 4 shows a section along the line A-A from FIG. 3. A brace is engaged with the cap 14 in such a way that it surrounds the sliding member 7 and the construction unit 1 consisting of a rotary lever 2 and a rotational body 3. Thus the brace 15 has a bearing box 16 of the second radial segment bearing.

According to a configuration of the invention shown in FIG. 3, the clamping unit of the disk brake has two braces 15, which are positioned around the cross bar 7 in such a way that they surround the rotary lever 2 in their midsection. By means of the braces 15 it is possible to hold together the construction unit that consists of the sliding member 7, radial segment bearings 10, 11, rotary lever 2, rotational body 3, synchronizing gear wheel mechanism 13, and the cap 14, and possibly of other components, for purposes of a better installation.

Figure 5:
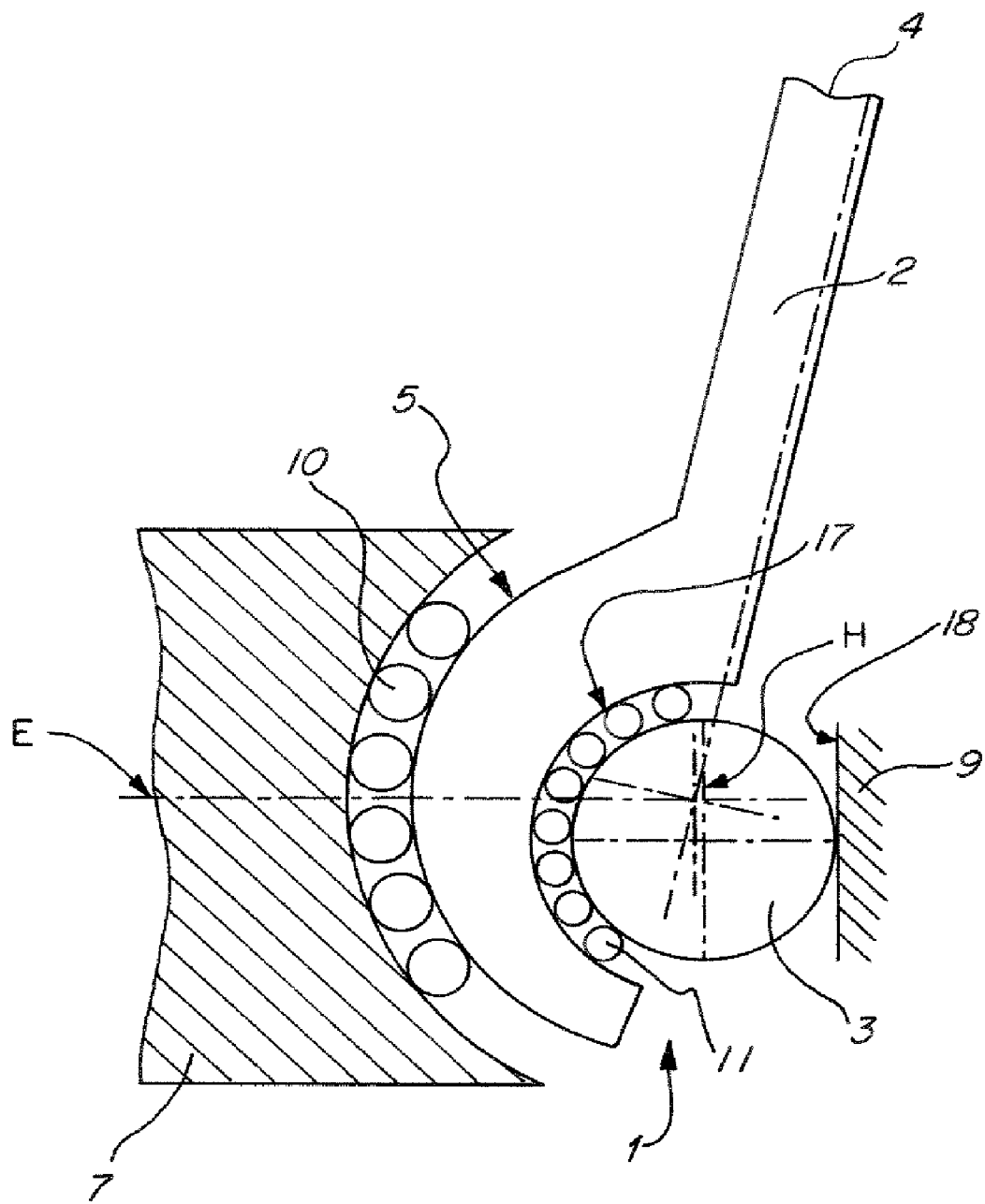
FIG. 5 shows a schematic view of the power transmission unit of a second embodiment according to the invention in one activation direction.
Figure 6:
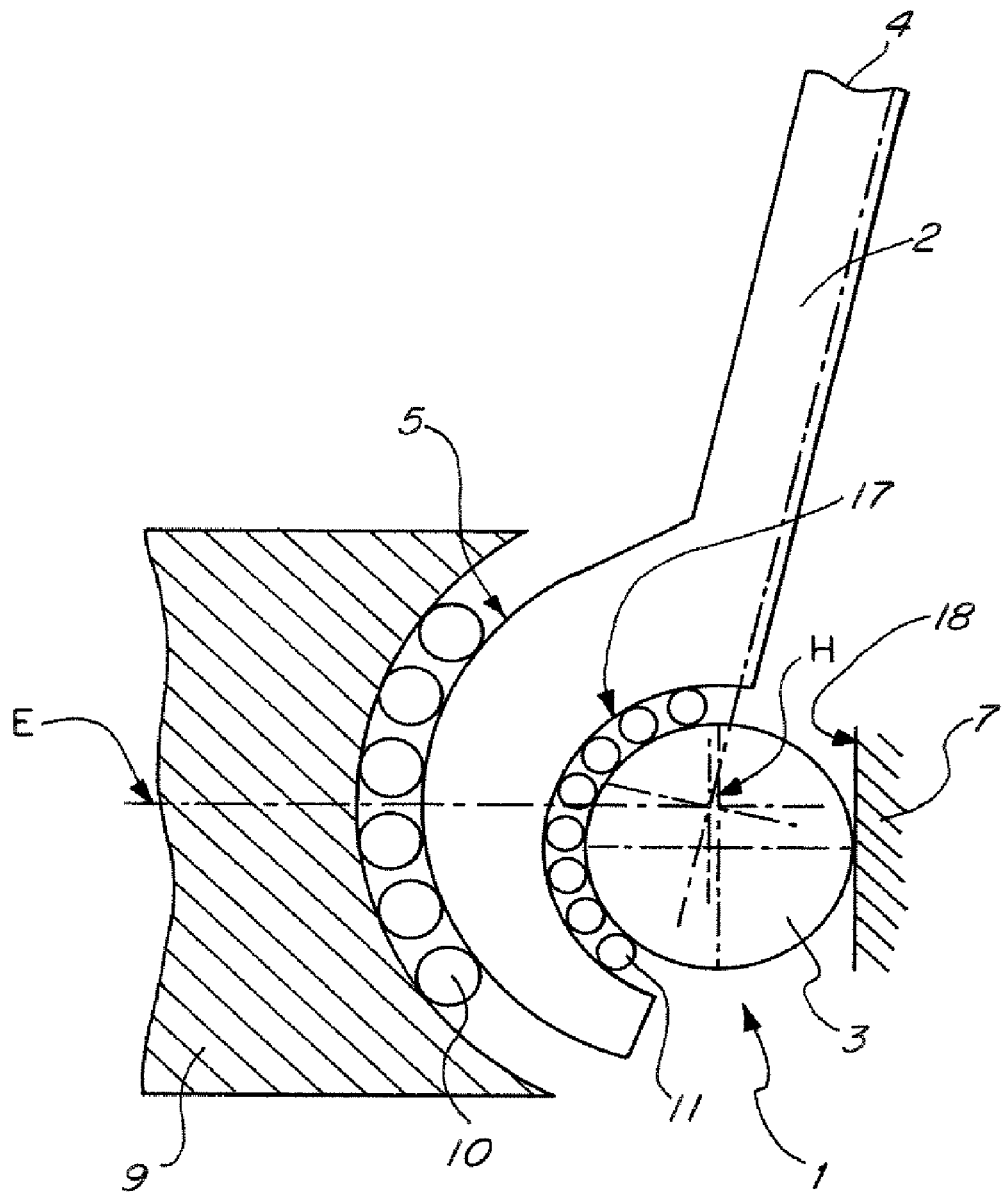
FIG. 6 shows a schematic view of this power transmission unit in a reverse activation direction.

FIGS. 5 and 6 show in schematic view a second embodiment of the power transmission unit according to the invention, which shows identical comp0onents with the same reference numbers.

These FIGS. 5 and 6 also depict a construction unit 1 that includes the essential components of a rotary lever 2 and of a rotational body 3.

The rotary lever 2 on its end facing the activation end 4 has a first bearing surface 5, which is cylindrically domed toward the outside. The rotary lever 2 has a second bearing surface 17 that is radially and also eccentrically displaced with respect to this first bearing surface 5; said second bearing surface 17 is domed toward the inside and likewise is cylindrical in shape.

On the side facing this bearing surface 17, the rotational body 3 is in contact with a level control surface 18, that is, on braking, this rotational body 3 completes a pure rolling motion on the flat control surface 18. Between the cylindrical surface of the rotational body 3 and the control surface 18 there is a purely linear contact.

The level control surface 18 is essentially parallel to the surface of the brake disk or basically vertical to the activation device of the sliding member 7.

In the variant shown in FIG. 5, the sliding member 7 is to the left, so that the rotary lever 2 is coupled with the sliding member 7 by means of the first radial segment bearing 10 and the rotational body 3 is coupled with the rotary lever 2 by means of the second radial segment bearing 11. The activation direction in the pivoting of the rotary lever 2 toward the left is consequently likewise directed toward the left in FIG. 5.

The invention also foresees, however, the possibility of again reversing the sequence of the components in construction unit 1, so that the rotary lever 2 is coupled with the brake caliper 9 by means of the first radial segment bearing 10 and the rotational body 3 is coupled with the rotary lever 2 by means of the second radial segment bearing 11. In this embodiment the sliding member 7 has the level control surface 18; that is, the activation direction is oriented toward the right, while the rotary lever 2 pivots to the left.

It is clear that, by means of the power transmission unit 1 consisting of the rotary lever 2 and the rotational body 3, both in the configurations seen in FIGS. 1 and 4 and in FIGS. 5 and 6, it becomes possible to realize a simple and cost-effective construction unit in which the negative effects of the sliding friction are avoided. In addition, the special combination of a control surface 6 or 18, with a defined course, makes it possible, with a rotational body 3 in contact with it and capable of rolling, to definitely secure the power course during braking or during release of the brakes.

What is claimed is:

1. A disk brake with a brake caliper comprising a brake disk, a sliding member which can be displaced in a vertical manner in relation to the surface of the brake disk in the brake caliper and can be engaged against the brake disk, and a clamping device comprising a rotary lever which can rotate around a rotational axis to turn in a rotational surface running vertical to the surface of the brake disk, and the rotary lever is equipped on its end turned away from an activation end with a bearing surface domed outward that is cylindrical and surrounds the rotational axis and, the rotary lever further comprises a control surface that is situated radially opposite and eccentric to the bearing surface and is domed inward in concave manner, and the clamping device further comprises a rotational body with rotary capacity in contact with the control surface, wherein every element of the control surface has a curvature radius greater than the radius of the rotational body, and the construction unit consisting of the rotary lever and rotational body is positioned between the sliding member and a cylindrical supporting surface of the brake caliper in contact with it, in such a way that, when the rotary lever pivots in a radial segment bearing, by means of reciprocal displacement of the rotational body and the rotary lever, the sliding member is displaced so that the position of the rotational axis of the rotary lever changes during the displacement of the sliding member.

2. A disk brake according to claim 1, distinguished in that the curvature radius is different in every element of the control surface in such a way that the control surface widens in concave manner.

3. A disk brake according to claim 2, distinguished in that the control surface has a greater widening in its lower section towards the activation end than in its upper section.

4. A disk brake according to claim 1, distinguished in that the bearing surface is coupled with the sliding member by means of the radial segment bearing and the rotational body on its side opposite the control surface is coupled with the brake caliper by means of a second radial segment bearing.

5. A disk brake according to claim 4, distinguished in that a brace that is engaged with a cap, which closes an opening in the brake caliper on its side toward the brake disk, has a bearing box of the second radial segment bearing.

6. A disk brake according to claim 5, distinguished in that two braces surround the rotary lever on both of its sides.

7. A disk brake according to claim 1, distinguished in that the bearing surface is coupled with the brake caliper by means of the first radial segment bearing and the rotational body on its side opposite the control surface is coupled with the sliding member by means of a second radial segment bearing.

8. A disk brake according to claim 1, distinguished in that the sliding member is configured in the shape of a cross bar that has two adjustment spindles.

9. A disk brake according to claim 8, distinguished in that the adjustment spindles are coupled with one another by means of a gear wheel mechanism which is positioned between a cap and the sliding member.

* * * * *